United States Patent
Narasimhan

(10) Patent No.: US 12,540,572 B2
(45) Date of Patent: Feb. 3, 2026

(54) ROTARY PISTON MACHINE

(71) Applicants: Chandra Shekhar Narasimhan, New Delhi (IN); Uditi Chandrashekhar, New Delhi (IN)

(72) Inventor: Chandra Shekhar Narasimhan, New Delhi (IN)

(73) Assignee: Uditi Chandrashekhar, New Delhi (IN)

( * ) Notice: Subject to any disclaimer, the term of this patent is extended or adjusted under 35 U.S.C. 154(b) by 0 days.

(21) Appl. No.: 18/907,388

(22) Filed: Oct. 4, 2024

(65) Prior Publication Data
US 2025/0116223 A1     Apr. 10, 2025

Related U.S. Application Data

(60) Provisional application No. 63/588,385, filed on Oct. 6, 2023.

(51) Int. Cl.
| | |
|---|---|
| F02B 53/04 | (2006.01) |
| F01C 1/10 | (2006.01) |
| F01C 19/02 | (2006.01) |
| F01C 21/00 | (2006.01) |
| F01C 21/10 | (2006.01) |
| F01C 21/18 | (2006.01) |
| F02B 55/08 | (2006.01) |
| F04C 2/10 | (2006.01) |
| F04C 15/00 | (2006.01) |
| F04C 15/06 | (2006.01) |

(52) U.S. Cl.
CPC .............. *F02B 53/04* (2013.01); *F01C 1/104* (2013.01); *F01C 19/02* (2013.01); *F01C 21/104* (2013.01); *F01C 21/18* (2013.01); *F02B 55/08* (2013.01); *F04C 2/103* (2013.01); *F04C 15/0007* (2013.01); *F04C 15/064* (2013.01); *F01C 2021/12* (2013.01)

(58) Field of Classification Search
CPC .......... F02B 53/04; F02B 55/08; F01C 1/104; F01C 19/02; F01C 21/104; F01C 21/18; F01C 2021/12
See application file for complete search history.

(56) References Cited

U.S. PATENT DOCUMENTS

| | | | | |
|---|---|---|---|---|
| 3,117,561 A | * | 1/1964 | Bonavera | F01C 1/22 418/142 |
| 3,338,220 A | * | 8/1967 | Marshall | F02B 53/00 418/61.3 |
| 3,764,239 A | * | 10/1973 | Huf | F02B 53/00 418/113 |
| 3,883,276 A | * | 5/1975 | Hofbauer | F01C 1/104 418/94 |
| 3,920,359 A | * | 11/1975 | Gray | F01C 1/22 418/91 |

(Continued)

*Primary Examiner* — J. T. Newton
(74) *Attorney, Agent, or Firm* — Kolisch Hartwell, P.C.

(57) ABSTRACT

A rotary piston machine includes a casing and a rotor assembly, each with a hypotrochoidal. The rotor assembly includes apices that conform to the hypotrochoidal profile of the casing, and the relative motion of the casing and the rotor assembly create variable volumes. The variable volume allows the rotary piston machine to function as a compressor, an expander, an internal combustion engine, a positive displacement pump, or a fluid-driven motor.

11 Claims, 15 Drawing Sheets

(56) References Cited

U.S. PATENT DOCUMENTS

| | | | | |
|---|---|---|---|---|
| 4,395,206 | A | * | 7/1983 | Hoffmann .................. F01C 1/22 418/61.3 |
| 5,399,078 | A | * | 3/1995 | Kuramasu ............... F02B 55/14 418/61.3 |
| 10,871,161 | B2 | * | 12/2020 | Valkenberg ............. F04C 29/02 |
| 2006/0140808 | A1 | * | 6/2006 | Sbarounis ............... F01C 1/104 418/61.2 |
| 2010/0058760 | A1 | * | 3/2010 | Wirz ....................... F03G 6/005 123/41.82 R |
| 2013/0028776 | A1 | * | 1/2013 | Gekht ....................... F01C 1/22 277/306 |
| 2013/0028777 | A1 | * | 1/2013 | Gekht ....................... F01C 1/22 29/888.012 |
| 2017/0204857 | A1 | * | 7/2017 | Garside ................. F04C 27/006 |
| 2021/0164387 | A1 | * | 6/2021 | Fan ......................... F02B 53/04 |

* cited by examiner

ROTARY PISTON MACHINE

CROSS-REFERENCE TO RELATED APPLICATION

This application claims priority to U.S. Provisional Patent Application Ser. No. 63/588,385, filed Oct. 6, 2023 and entitled ROTARY PISTON MACHINE, the disclosure of which is incorporated herein by reference.

TECHNICAL FIELD

The present disclosure pertains to a rotary piston machine. More particularly, the present disclosure pertains to a rotary piston machine having hypotrochoidal profiles and rotary valves to control inlet and exit of fluids in variable volume chambers.

BACKGROUND

Current reciprocating type internal combustion engines are characterized by high component counts, complexity, and overall volume/size. Rotary piston engines generally have fewer components and smaller volume/size. The primary drawbacks of the existing rotary piston engines are in terms of lower fuel efficiency and higher emissions. Also, the ported fluid exchange systems used in the existing rotary engines contribute to a greater loss of energy to the exhaust stream. Moreover, most existing rotary piston machines in internal combustion engine (ICE) configurations suffer from differential temperatures and expansion (some areas are cool and some hot) which leads to operational issues.

SUMMARY

The present invention discloses a rotary piston machine, comprising: a casing with an internal hypotrochoidal profile. Furthermore, the rotary piston machine includes a rotor assembly with an approximation of a hypotrochoidal profile. The rotor assembly's apexes conform to the hypotrochoidal profile of the casing, with the relative motion(s) of the casing and the rotor assembly creating variable volumes. The variable volumes allow the rotary piston machine to function as a compressor, an expander, an internal combustion engine or a positive displacement pump or fluid driven motor.

In an embodiment, the rotary piston machine operates in the single rotation model—wherein the rotor assembly and the casing rotate synchronously in the same direction at fixed ratios on their fixed non coincidental axes. The rotation(s) of the rotor assembly and casing are synchronized at relative ratio(s) by a phasing mechanism. Furthermore, in an embodiment of operation in the planetary rotation model, the rotor assembly is mounted on an eccentric axis to a casing's axis, orbiting about the casing axis while rotating on its axis counter to shaft rotation in phase with the stationary casing.

The rotor assembly includes a sealing grid consisting of side seals, apex seals, and corner seal elements to bridge the apex and side seals. The sealing grid allows for a three-dimensional continuous seal path between the rotor assembly and the casing, and the sealing grid prevents leakage of fluids from the working chambers.

In the planetary rotation models, the casing further incorporates one or more rotary valve(s) per side(s) of the stationary casing with ports leading to the working chambers. The rotary valve(s) allow inlet/intake/input and outlet/exhaust/output of fluids from the working chambers. The arrangement of the rotary valve(s) is dependent on the function of the rotary piston machine. The rotary valves are driven by a synchronous mechanism to allow for the inlet/intake/input and outlet/exhaust/output of fluids to and from the variable volume working chambers at pre-determined intervals.

In an embodiment of a four-cycle internal combustion engine (ICE) in the planetary rotation model the hypotrochoidal profile has an even (n) number of sides. Further, the corresponding outer surface of the rotor assembly approximating a hypotrochoidal profile has an odd number of sides one less (n−1) than the sides of the casing, whose apexes conform to the internal hypotrochoidal profile in operation. In the ICE planetary rotation model embodiment, the casing comprises one or more rotary valve(s) arranged on alternate sides of the even number sided hypotrochoidal profile. The alternate sides of the even sided hypotrochoidal profile which do not have valves incorporate means of combustion for operating as an internal combustion engine. In an embodiment, the rotary valve arrangement comprises one rotary valve controlling intake and output/exhaust processes.

In an embodiment, the rotary valve arrangement comprises at least two rotary valves adjacent to each other per side of the hypotrochoidal profile, wherein at least one rotary valve is exclusive for air/fluid inlet/intake/input, and at least one rotary valve is exclusive for air/fluid outlet/exhaust/output.

The present invention discloses a method for generating power from a rotary piston machine in an embodiment as an internal combustion engine, comprising of four cycle operation—intake, compression, power, exhaust during the relative motions of the rotor assembly in the casing with the intake and exhaust processes being processed in a suitable timed manner by the system of rotary valve(s) and power generated by the means of combustion.

For operations as a compressor, expander, positive displacement pump or fluid driven motor, the rotary piston machine incorporates rotary valve(s) on each side of the hypotrochoidal profile, with operations being performed in two cycles-inlet/intake/input and outlet/exhaust/output.

DETAILED DESCRIPTION

Figure 1:
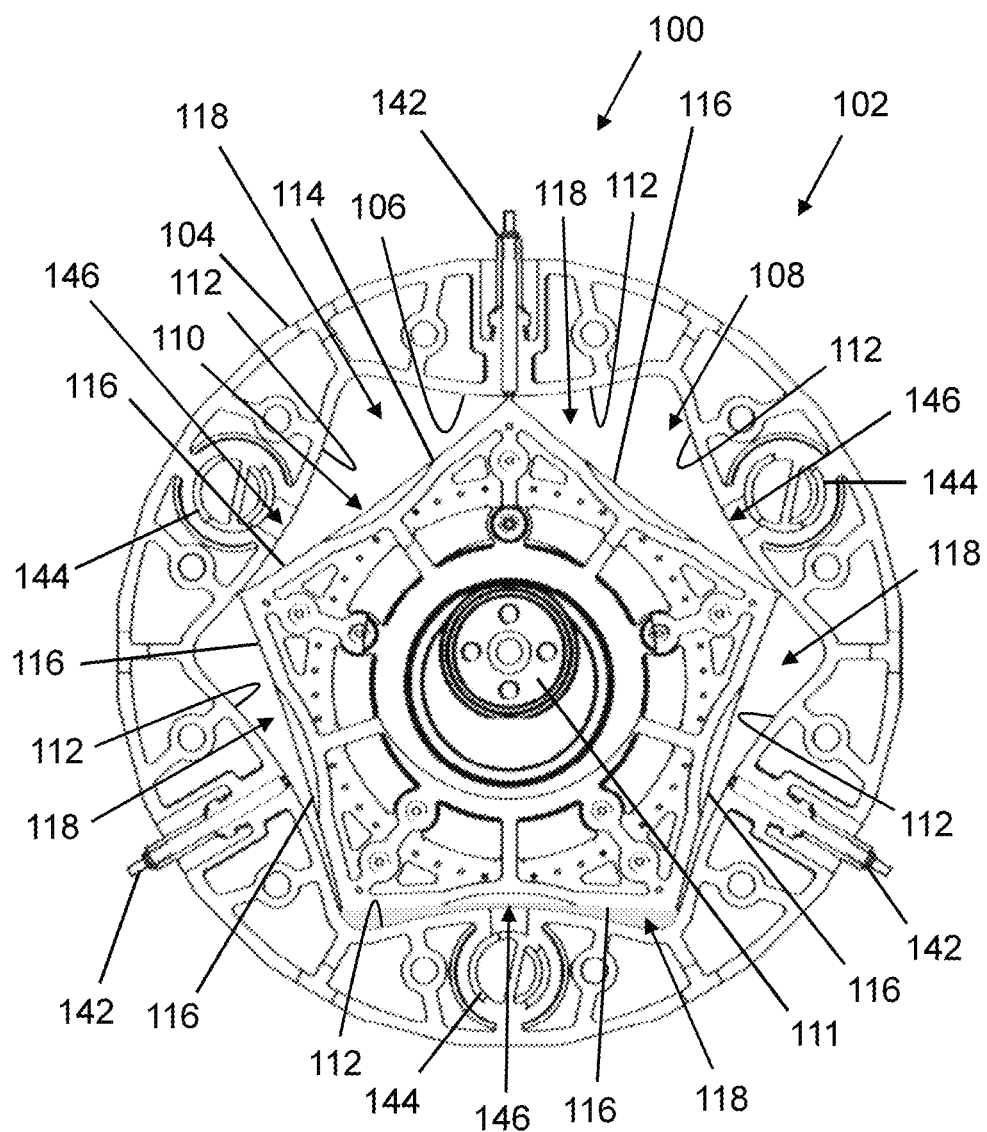
FIG. 1 illustrates a sectional view of a rotary piston machine having a casing and a rotor arranged inside the casing, in accordance with an embodiment of the disclosure.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc., mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below", or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Reference will now be made in detail to specific embodiments or features, examples of which are illustrated in the accompanying drawings. Generally, corresponding reference numbers will be used throughout the drawings to refer to the same or corresponding parts. Also, wherever possible, the same reference numbers will be used throughout the drawings to refer to the same or the like parts.

Referring to FIG. 1, a sectional view of a rotary piston machine 100, for example, a rotary internal combustion engine 102, simply referred to as engine 102, is shown. Although the rotary piston machine 100 is shown and contemplated as the rotary internal combustion engine 102, it may be envisioned that the rotary piston machine 100 may be a rotary compressor, a positive displacement pump, or an expander or a fluid driven motor. As shown, the engine 102 includes a casing 104, for example, a stationary casing, having an inner surface 106 defining a chamber 108, and a rotor assembly 110 arranged inside the chamber 108 and configured to rotate inside the chamber 108. The rotary assembly operates in the planetary rotation model wherein the rotor assembly 110 orbits on an eccentric axis offset to the axis of the stationary casing 114 while rotating in a counter direction of the output shaft 111.

Further, the inner surface 106 of the casing 104 is a hypotrochoidal profile having an even number of sides (n) 112, while an outer surface 114 of the rotor assembly 110 also includes a profile having an odd number of sides (n−1) 116 whose apexes conform to the internal hypotrochoidal profile in operation. In the illustrated embodiment, the casing 104 includes 6 sides, while the rotor assembly 110 includes 5 sides. The rotor assembly 110 is arranged inside the casing 104 such that a plurality of variable volume chambers 118 are defined between the plurality of sides 116 of the rotor assembly 110 and the casing 104. As shown, each side 116 defines a single variable volume chamber 118 with the casing 104. Due to the orbital rotation of the rotor assembly 110 inside the casing 104, a volume of each of the chambers 118 keeps changing, thereby defining various strokes of the engine 102. Further, a portion of the outer surface 114 associated with each of the sides 116 defines a combustion chamber bowl 119 (shown in FIG. 2) in which the ignition of the air-fuel mixture takes place at the start of combustion stroke.

Figure 2:
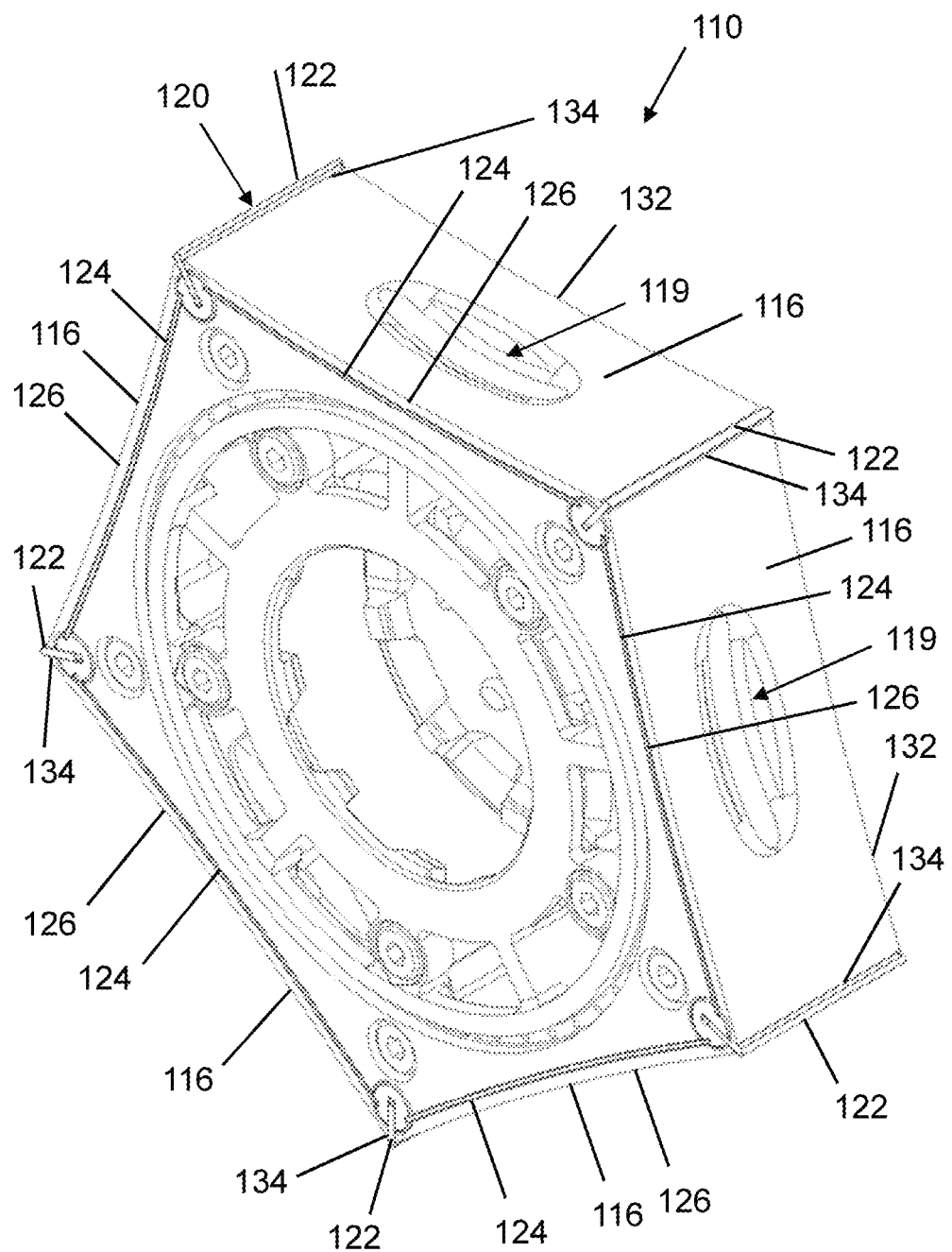
FIG. 2 illustrates a perspective view of the rotor assembly of FIG. 1 with a sealing grid of the rotary piston machine engaged to the rotor, in accordance with an embodiment of the disclosure.
Figure 3:
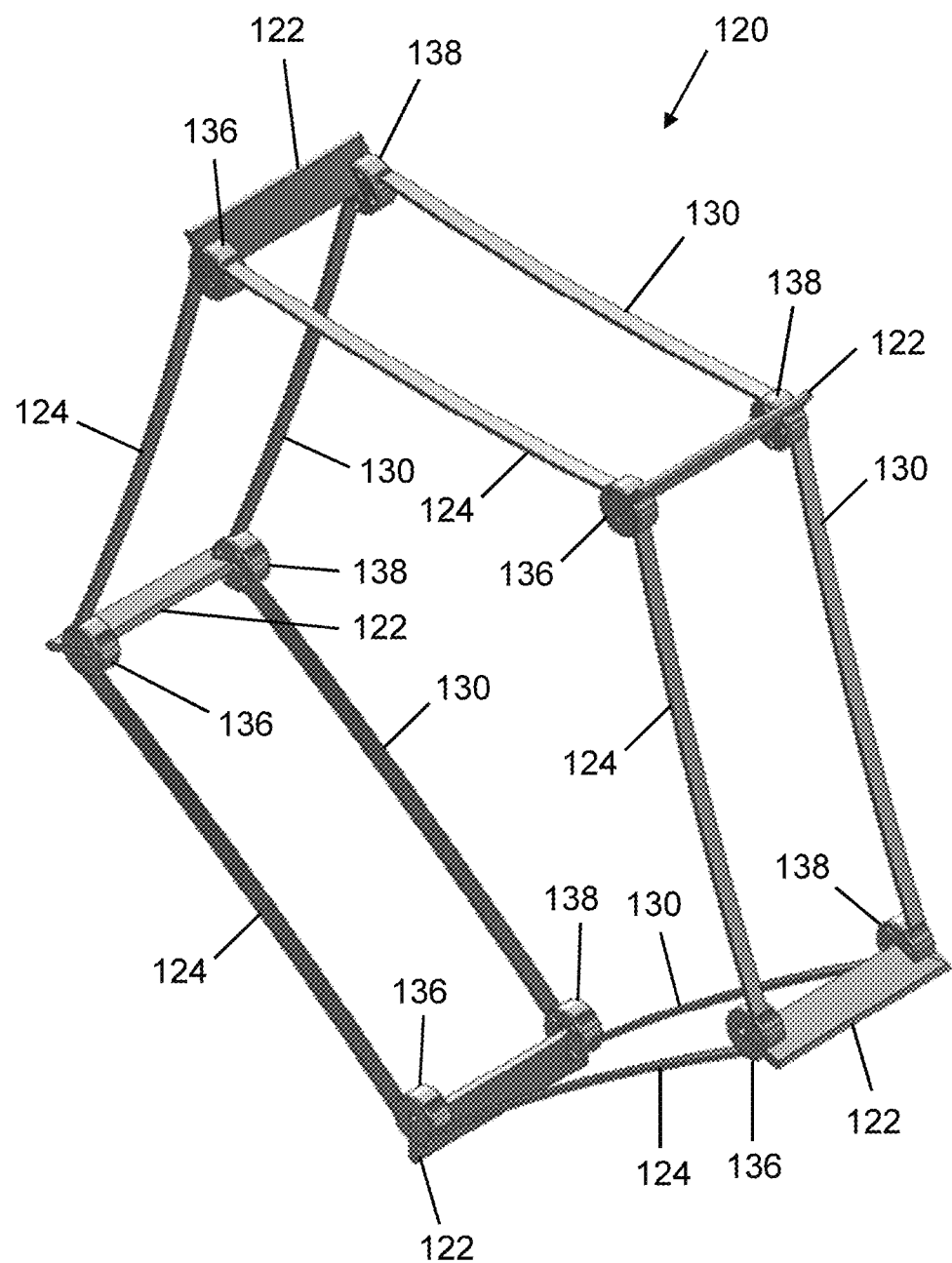
FIG. 3 illustrates a perspective view of the sealing grid of FIG. 2 depicting a plurality of first side seals, a plurality of second side seals, a plurality of first corner connecting seal pieces, a plurality of second connecting side seals, and a plurality of apex seals, in accordance with an embodiment of the disclosure.

To prevent the exchange of fluid between the chambers 118 and leakage of the gases from the chambers 118, as shown in FIGS. 2 and 3, the engine 102 includes a sealing grid 120 coupled to the rotor assembly 110. As shown, the sealing grid 120 includes a plurality of apex seals 122, and a plurality of side seals. The plurality of side seals comprises a plurality of first side seals 124 extending along a first side edge 126 of the rotor assembly 110, and a plurality of second side seals 130 extending along a second side edge 132 of the rotor assembly 110. The plurality of apex seals 122 extends between the plurality of first side seals 124 and the plurality of second side seals 130 and is arranged along a plurality of apexes 134 defined at intersections of the adjacent sides 116 of the rotor assembly 110.

Further, the sealing grid 120 includes a plurality of first corner connecting seal pieces 136 coupled to the rotor assembly 110 and connecting the plurality of first side seals 124 and the plurality of apex seals 122. As shown, a single first corner connecting seal piece 136 is arranged at an interaction of at least two adjacently arranged sides 116 of the rotor assembly 110 and connects at least two adjacently arranged first side seals 124 and a single apex seal 122 arranged therebetween. Similarly, the sealing grid 120 includes a plurality of second corner connecting seal pieces 138 coupled to the rotor assembly 110 and connecting the plurality of second side seals 130 and the plurality of apex seals 122. As shown, a single second corner connecting seal piece 138 is arranged at an interaction at least the two adjacently arranged sides 116 of the rotor assembly 110 and connects at least two adjacently arranged second side seals 130 and a single apex seal 122 arranged therebetween. The side seals 124, 130 restrict/prevents the leakage of gases through a gap between the rotor assembly 110 and the casing 104, while the apex seals 122 prevents/restricts the leakage of gases between the adjacently arranged chambers 118. It may be appreciated that each apex 134 defines a groove (not shown) to receive a portion of associated apex seal 122 and a portion of the apex seal 122 extends outwardly of the groove (not shown) and contacts the inner surface 106 of the casing 104.

In some embodiments, referring back to FIG. 1, the engine 102 may be a spark ignition engine. In such a case, to facilitate the combustion of air fuel mixture inside the chamber 118 at an end of the compression stroke, the engine 102 includes a plurality of means of combustion 142, for example, 3 means of combustion 142, mounted to the casing 104 and configured to provide spark for igniting the air fuel mixture at the end of the compression stroke.

To facilitate an intake of air fuel mixture inside the chamber 118 during an intake stroke, and to facilitate an exit of exhaust gases from the chamber 118 during an exhaust stroke, the engine 102 includes a plurality of rotary valves 144, for example 3 valves 144, mounted at a plurality of ports 146 of the casing 104. It may be appreciated that more than one port 146 may be associated with a single rotary valve 144. As shown, the ports 146, and hence the rotary valves 144, and the means of combustion 142 are arranged such that a single means of combustion 142 is mounted to a side 112 of the casing 104 that is arranged between two adjacently arranged sides 112 of the casing 104 having the ports 146. As illustrated, at least one rotary valve 144 is arranged between at least two means of combustion 142 and at least one means of combustion 142 is arranged between at least two rotary valves 144. For example, a single rotary valve 144 is arranged between two means of combustion 142 and a single means of combustion 142 is arranged between two rotary valves 144.

Figure 4:
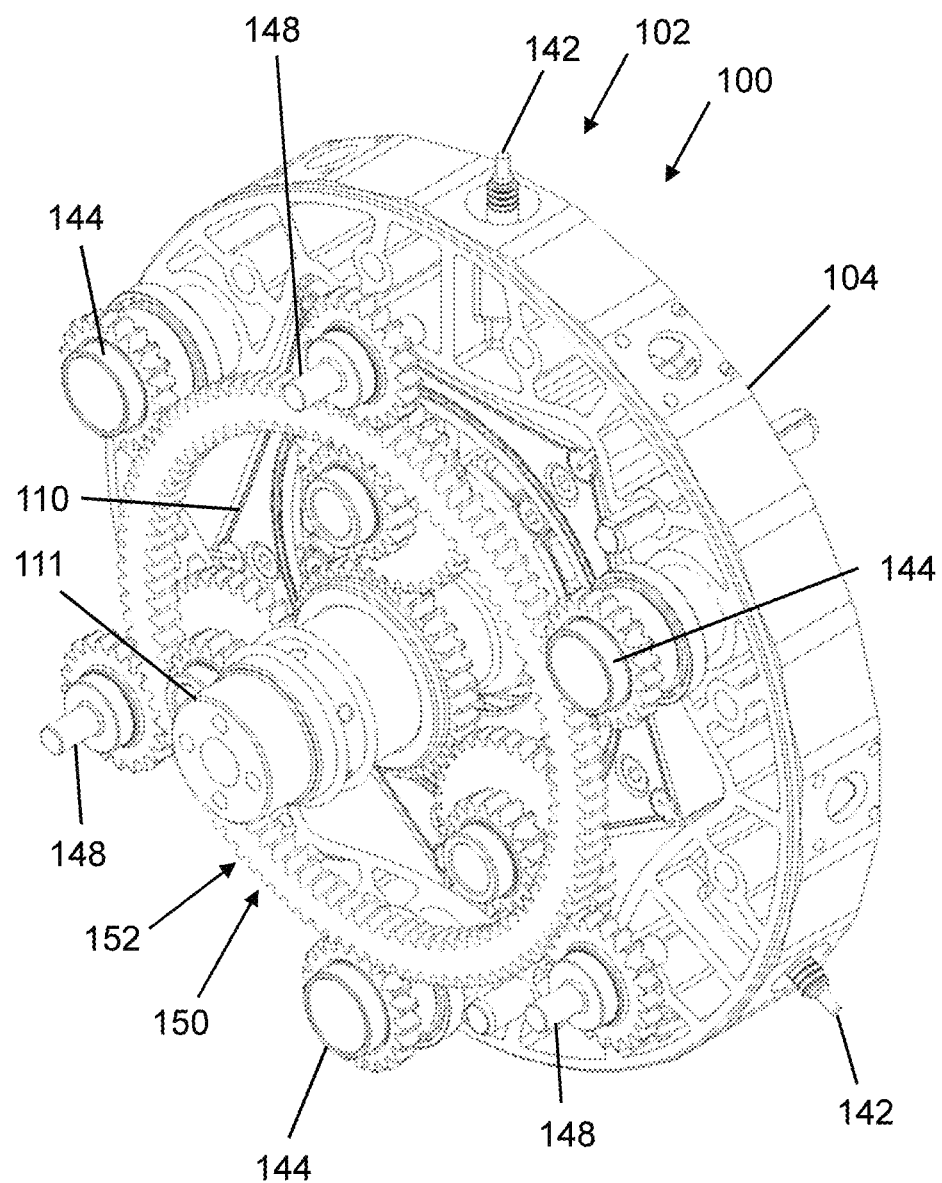
FIG. 4 illustrates a perspective view of the rotary piston machine with some of the components removed to depict an actuation mechanism for the rotary valves and other accessories of the rotary piston machine, in accordance with an embodiment of the disclosure.

Additionally, referring to FIG. 4, the engine 102 includes an actuator mechanism 150 to actuate and operate the opening and closing of the rotary valves 144. In the illustrated embodiment, the actuator mechanism 150 includes a gear assembly 152 connected to the output shaft 111 and configured to rotate the rotary valves 144. The gears of the gear assembly 152 are selected, arranged, and configured such that the rotary valves 144 open and close the associated ports 146 as per the desired timings to enable an intake of air fuel mixture as well exhaust of gases. Similarly, multiple drive outputs 148, are also incorporated to drive ignition, lubrication and other systems as required. Although the actuator mechanism 150 is shown and contemplated as the gear assembly 152, it may be appreciated that the actuator mechanism 150 may include a sprocket chain assembly, a timing belt assembly, a pulley assembly, or any combination thereof known in the art.

Alternatively, the engine 102 may be a compression ignition engine, and in such a case, the engine 102 may include fuel injectors instead of the means of combustion 142 to inject fuel inside the chambers 118 at the end of the compression stroke. Any means of combustion, such as lasers, plasma devices, pre chamber systems, or any other means known in the art, can be used for ignition processes.

Figure 5:
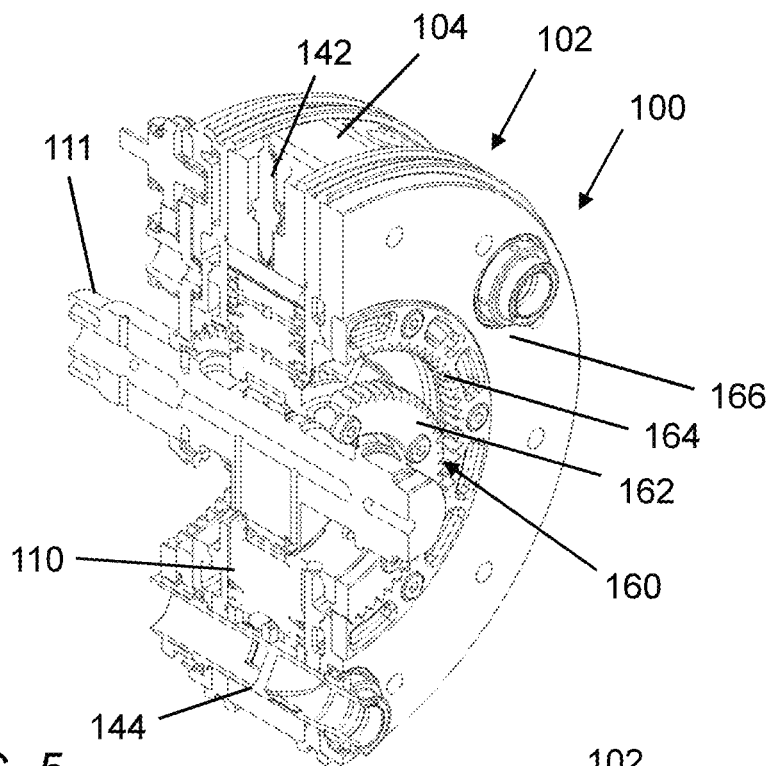
FIG. 5 illustrates a sectional perspective view of the rotary piston machine with some of the components removed to depict a phasing mechanism of the rotary piston machine, in accordance with an embodiment of the disclosure.
Figure 6:
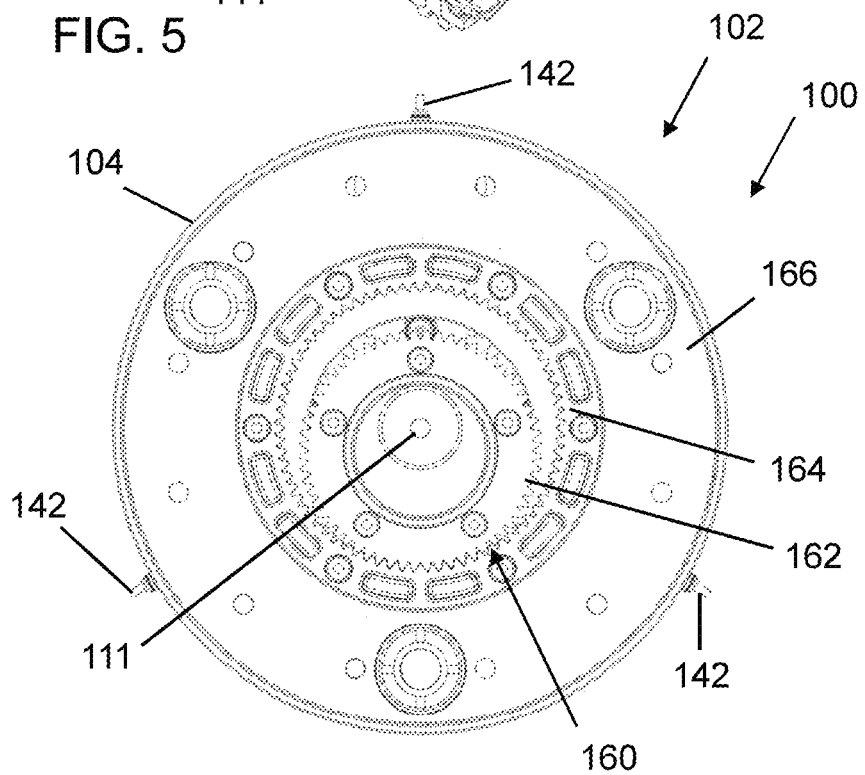
FIG. 6 illustrates a section view of the rotary piston machine with some of the components removed to depict the phasing mechanism of the rotary piston machine, in accordance with an embodiment of the disclosure.

Further, referring to FIGS. 5 and 6, the rotary piston machine 100 (i.e., the engine 102) includes a phasing mechanism 160 to keep the rotor assembly 110 and the casing 104 in a predetermined phase during the working of the engine 102. As shown, the phasing mechanism 160 includes a first gear 162, for example, an external gear 162, coupled to the rotor assembly 110, and a second gear 164, for example, an internal gear 164, operatively engaged to the first gear 162 and coupled to the casing 104. In the illustrated embodiment, the phasing mechanism 160 may include a stationary structure 166 to which both the second gear 164 and the casing 104 is attached. It may be appreciated that the phasing mechanism could consist of any other means known in the art.

Figure 7:
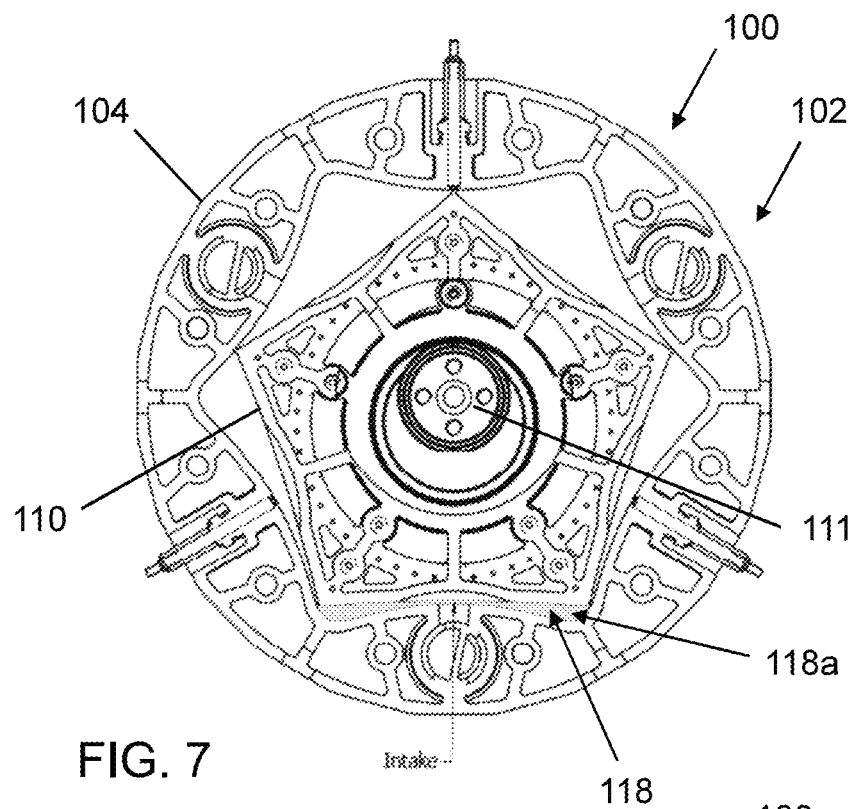
FIGS. 7-17 depicts various positions of the rotors depicting various strokes of an engine cycle associated with a chamber of the rotary piston machine, in accordance with an alternative embodiment of the disclosure.
Figure 8:
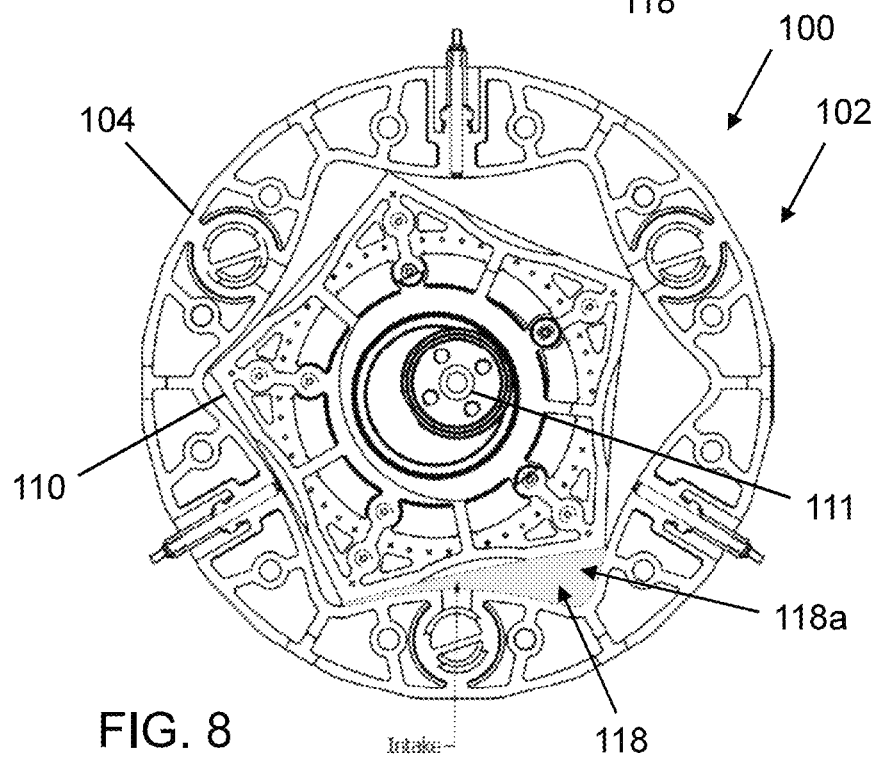
Figure 9:
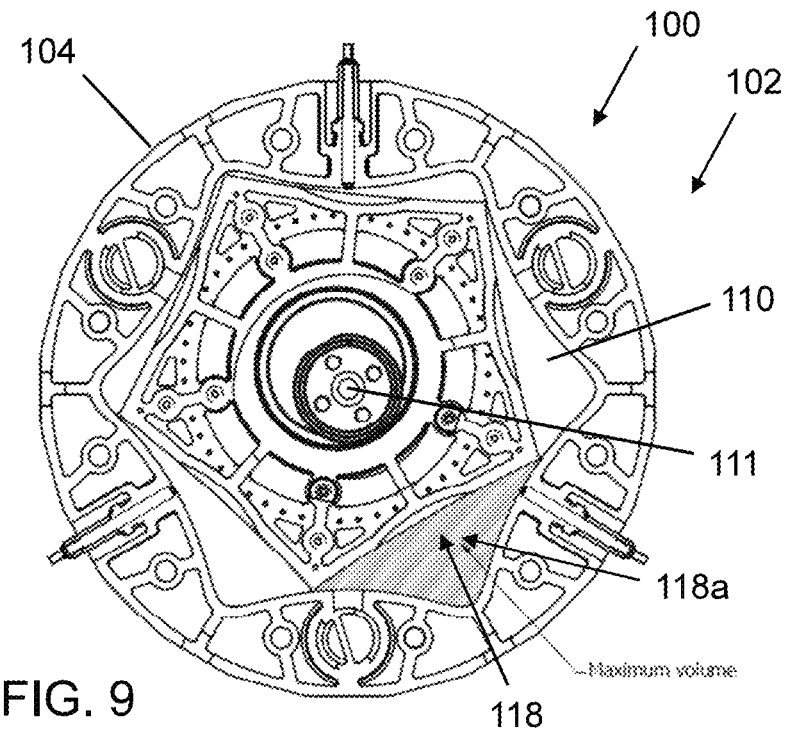
Figure 10:
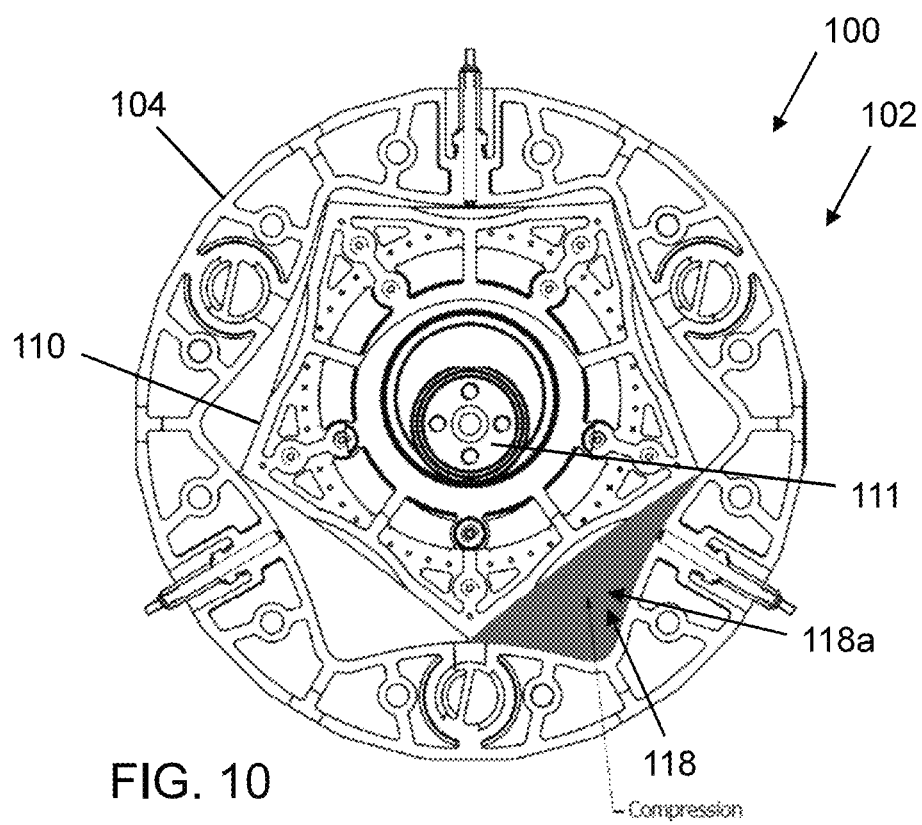

A working of the engine 102 is now explained with reference to FIGS. 7 to 17. As shown. The working is explained with reference to one of the chambers 118, for example, a chamber 118a. As the output shaft 111 rotates in the clockwise direction, the rotor assembly 110 orbits eccentrically while rotating in a counter clockwise direction inside the casing 104. FIG. 7 shows a position of the chamber 118a and associated volume of the chamber 118a at an end of the exhaust stroke and a start of an intake stroke, i.e., corresponding to a top dead center position of a piston of a reciprocating internal combustion engine. As shown in FIGS. 7 and 8, air fuel mixture flows inside the chamber 118a, as the rotor assembly 110 rotates and orbits with respect to the output shaft 111, due to the suction created by the increase in volume of the chamber 118a. The intake stroke ends in the chamber 118a as the volume reaches the volume corresponding to maximum swept volume (as shown in FIG. 9) i.e., corresponding to a bottom dead center position of a piston of a reciprocating internal combustion engine.

Figure 12:
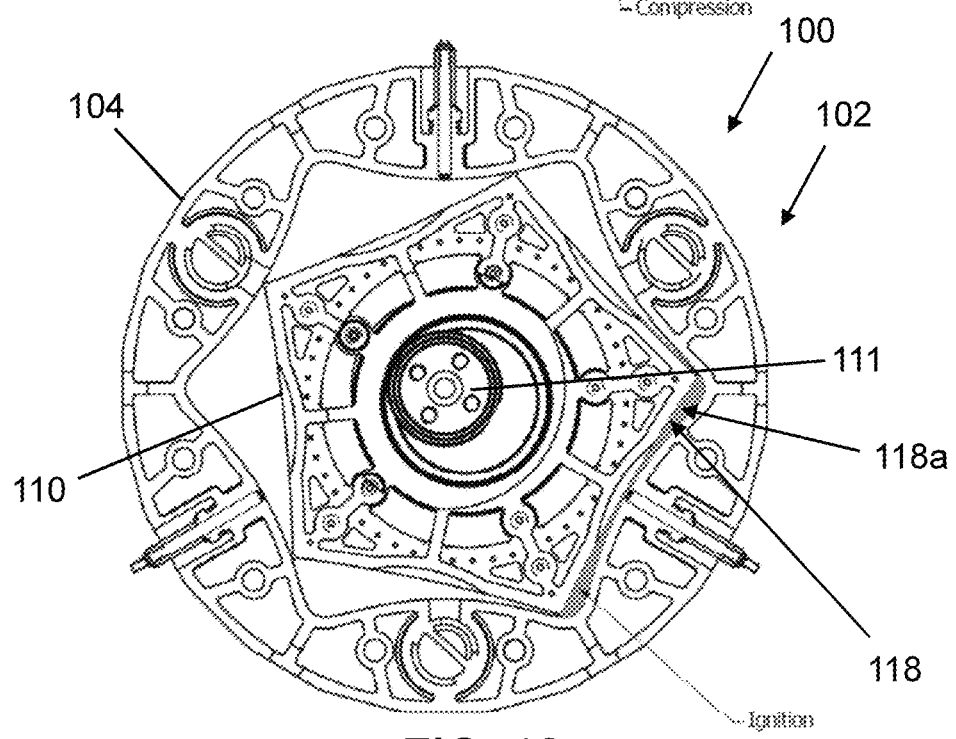
Figure 13:
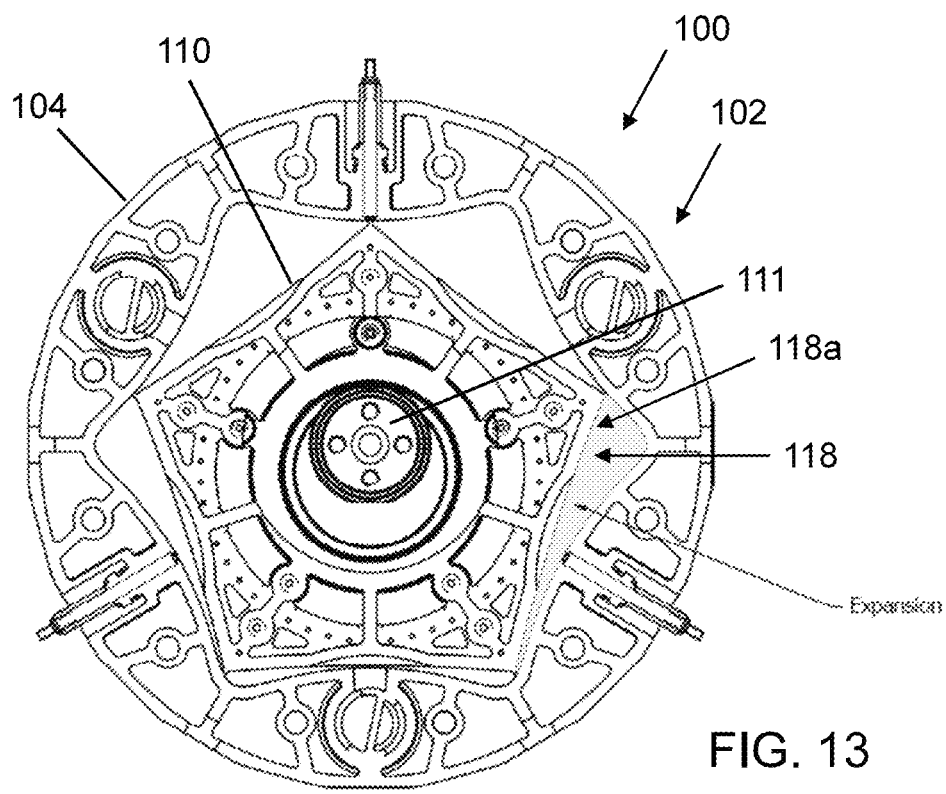

Upon further rotation of the output shaft 111 and hence the orbiting of the rotor assembly 110 on the output shaft 111 eccentrically while rotating in the counter direction, the volume of the chamber 118a starts decreasing, initiating a compression stroke (shown in FIG. 10), hence a compression of the air fuel mixture present inside the chamber 118a. As the rotor assembly 110 rotates, the volume inside the chamber 118a reaches its minimum value (as shown in FIG. 12), indicating a completion of a compression stroke. At this moment, as per the predefined timing, the associated means of combustion 142 is actuated to spark ignite the air-fuel mixture present inside the chamber 118a i.e., the combustion chamber bowl 119, shown in FIG. 2.

Figure 14:
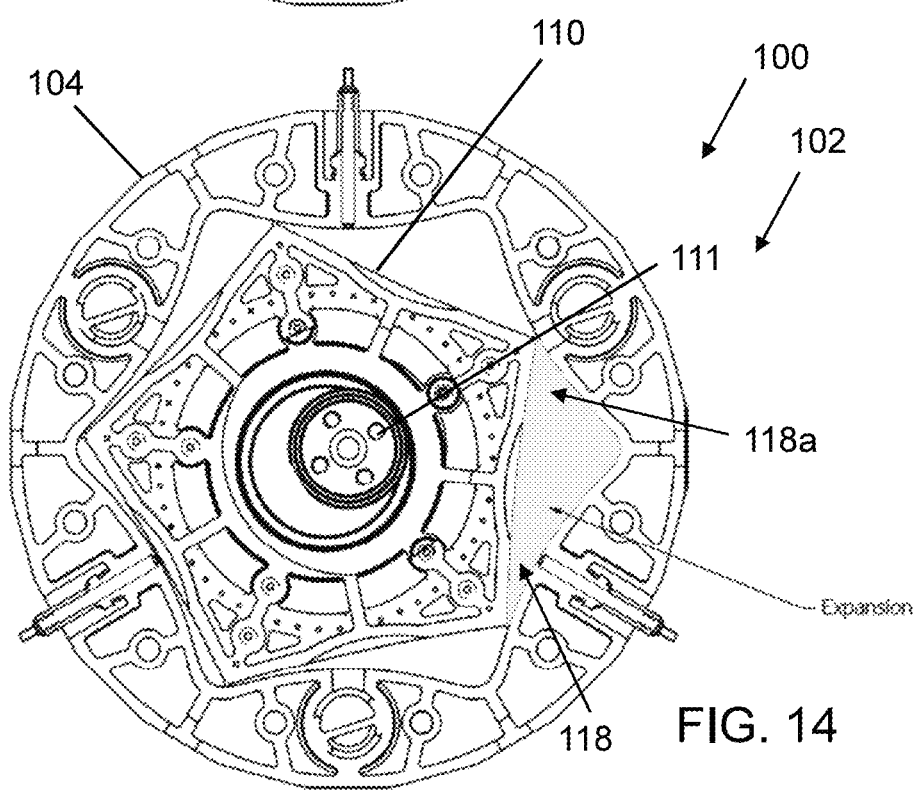
Figure 15:
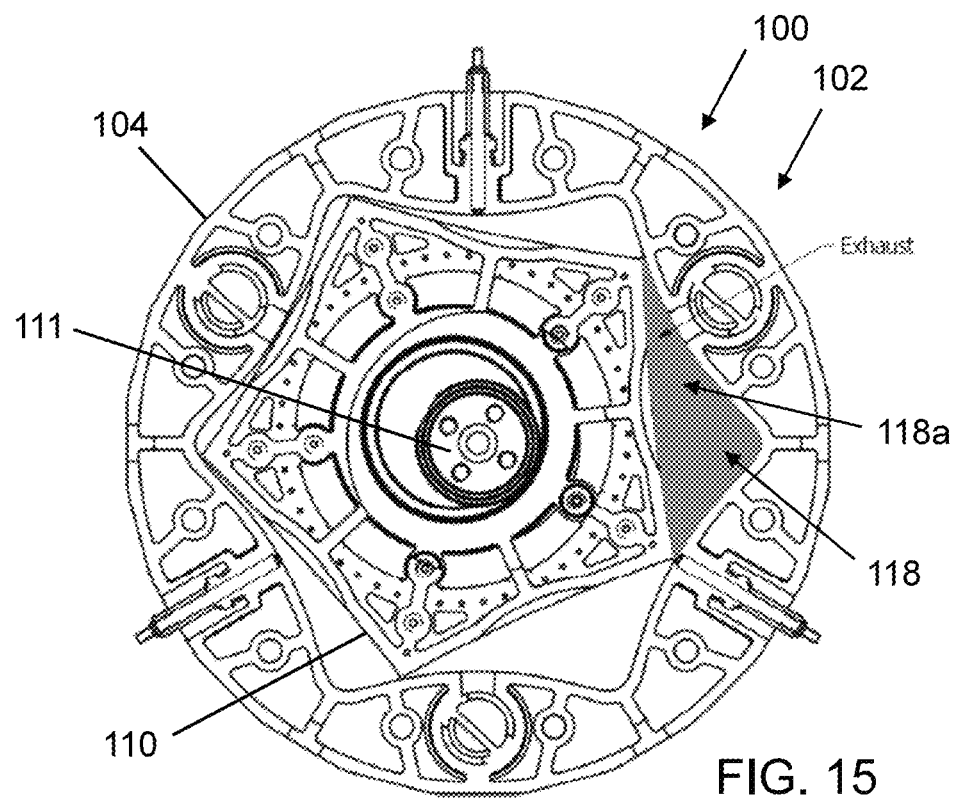
Figure 16:
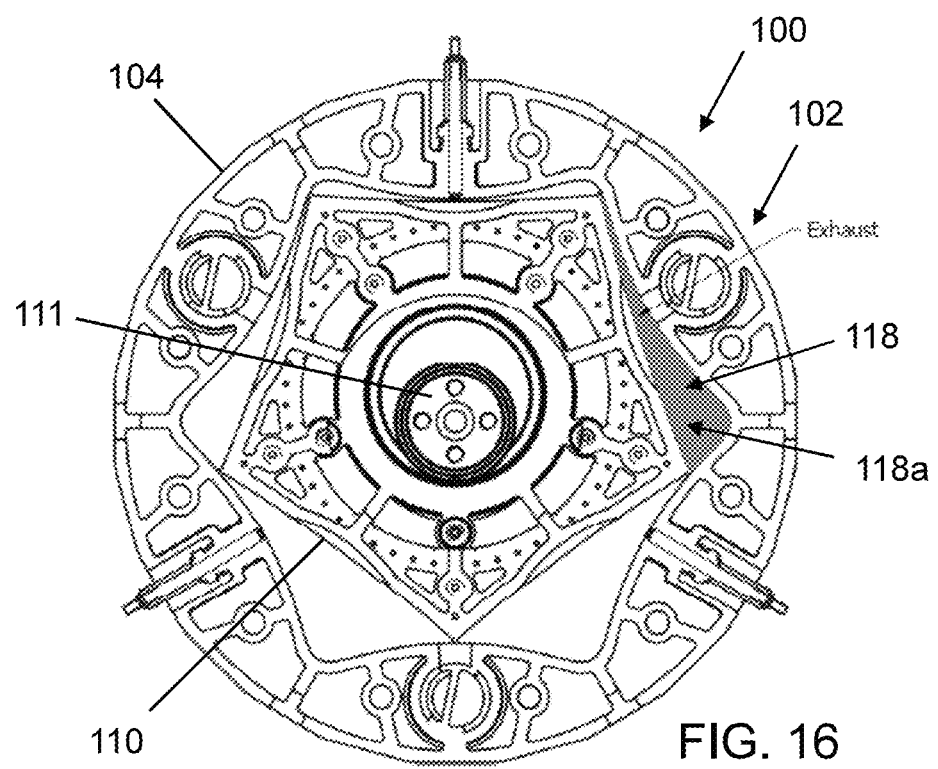
Figure 17:
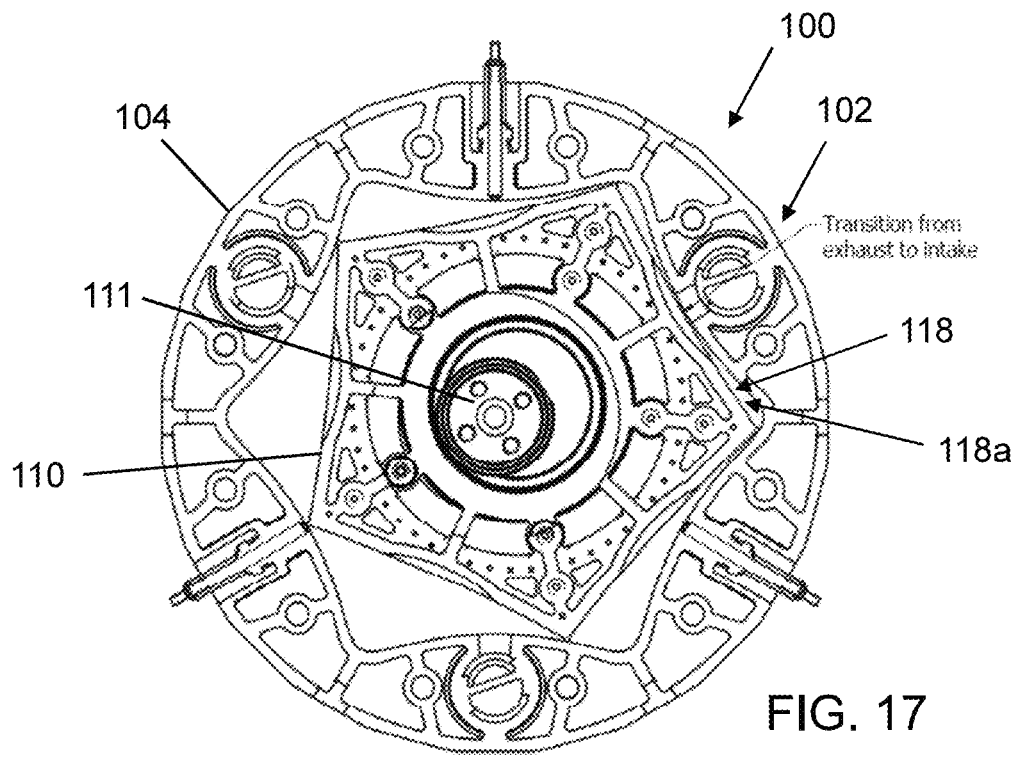
Figure 18:
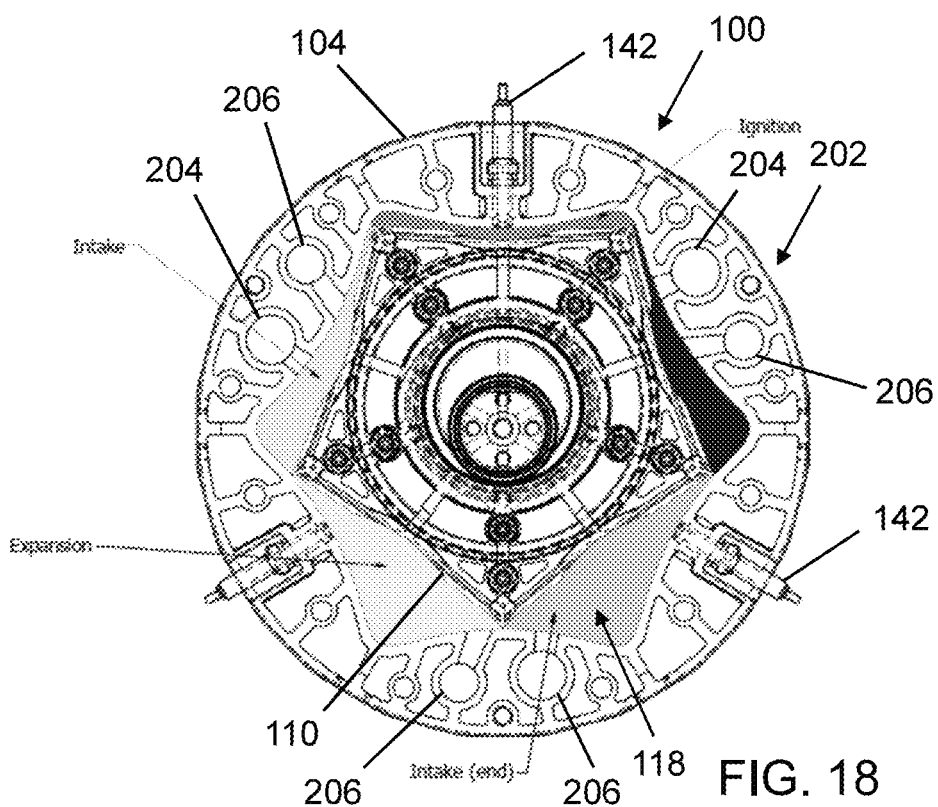
FIG. 18 illustrates a sectional view of a rotary piston machine having a combination of 5:6, three (3) power strokes per output shaft rotation in 4-cycle operation occur, in accordance with an embodiment of the disclosure.

Due to the ignition of the air-fuel mixture inside the chamber 118a, an expansion of the gases present inside the chamber 118a happens, generating power, and rotating the rotor assembly 110, and initiating a power stroke (as shown in FIG. 12). During the power stroke, the volume of the chamber 118a increases and reaches the orientation, as shown in FIG. 14, at which associated rotary valve 144 is opened as per the timing determined as per designed operating parameters. Upon further movement of the rotor assembly 110, the volume of the chamber 118a starts decreasing, pushing the exhaust gases present inside the chamber 118a out of the chamber 118a through the port 146 of the casing 104, as shown in FIGS. 15 and 16. FIG. 17 depicts a completion of the exhaust stroke and initiation of a new intake stroke for the chamber 118a. In this manner, due to the combination of 5:6, three (3) power strokes in four (4)-cycle operation occur during a single revolution of the output shaft 111 as shown in FIG. 18. The number of 4-cycle operations is dependent on the number of chambers 118 defined by the casing 104 and the rotor assembly 110 combination, and the number of power strokes that takes place during a single revolution of the output shaft 111 is equal to one half of the sides of the casing.

Referring to FIG. 18, an alternative engine 202 is shown. The engine 202 is different from the engine 102 in that instead of a single rotary valve 144 between two means of combustion 142 that allows both intake and exhaust, the engine 202 includes one intake rotary valve 204 actuated to allow only intake of air and one exhaust rotary valve 206 operated to allow exit of exhaust gases.

Figure 19:
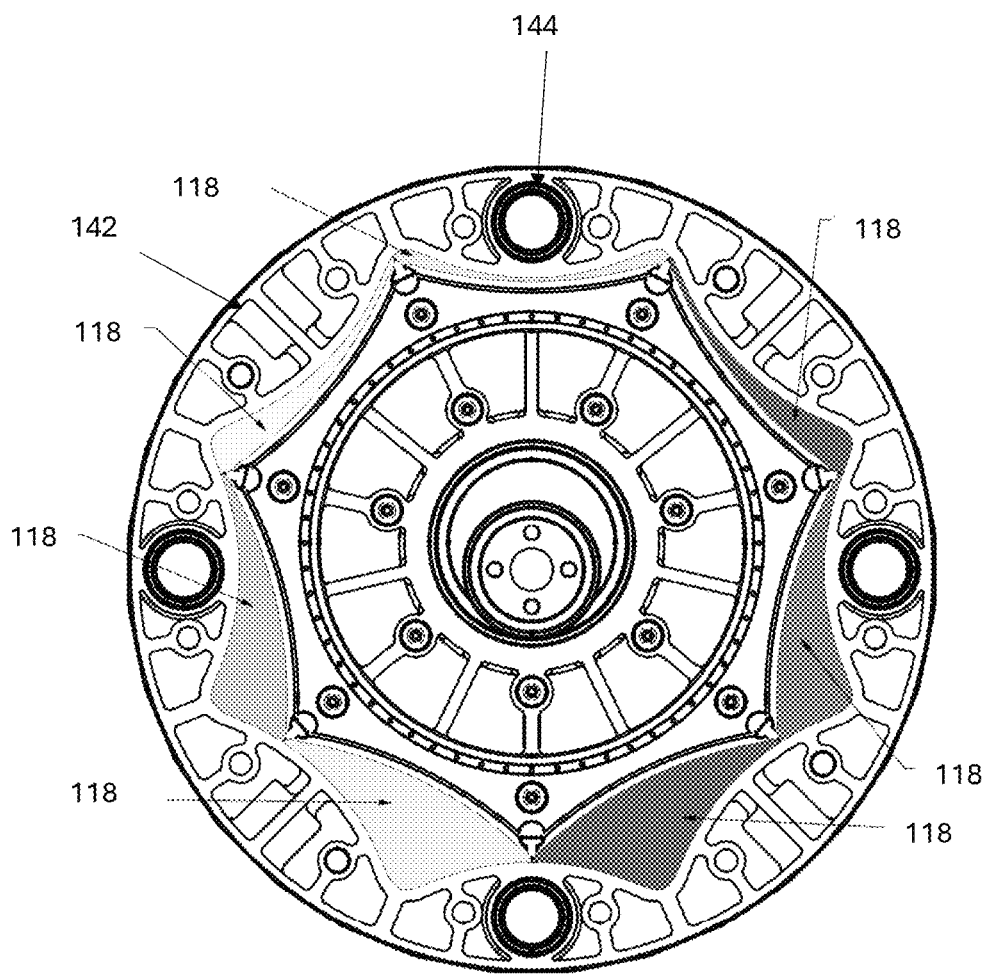
FIG. 19 illustrates a sectional view of a rotary piston machine having a combination of 7:8, four (4) power strokes per output shaft rotation in 4-cycle operation occur, in accordance with an embodiment of the disclosure.

In another exemplary embodiment, in the combination of 7:8, four (4) power strokes in four (4)-cycle operation occur, during a single revolution of the output shaft 111, as shown in FIG. 19.

Figure 20:
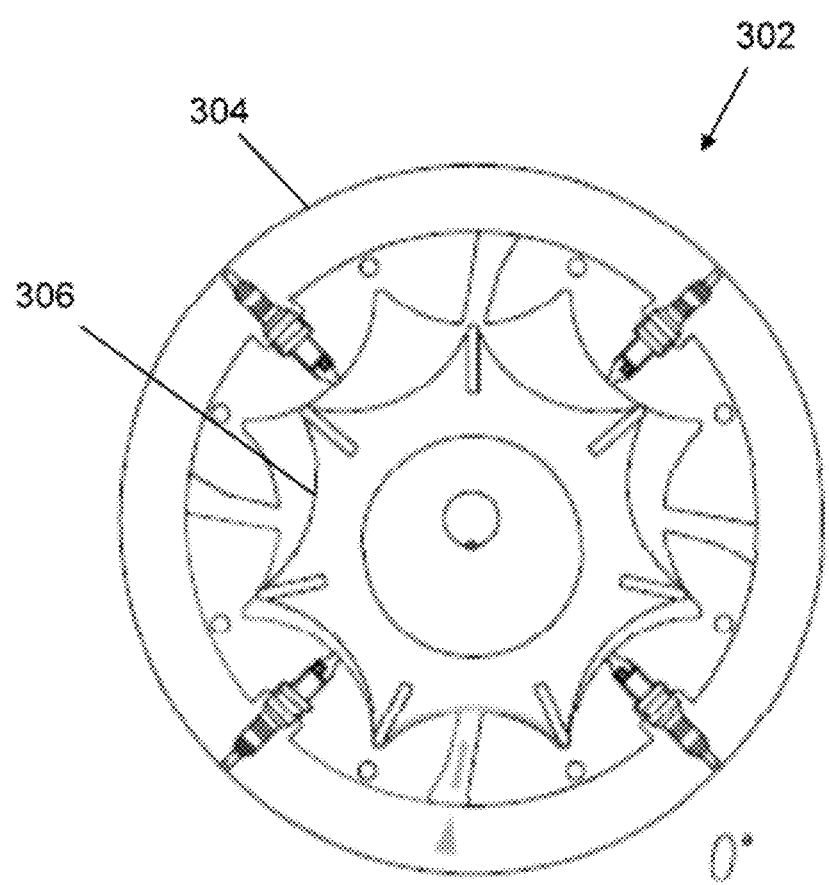
FIG. 20 illustrates a sectional view of a rotary piston machine having a rotatable casing and a rotatable rotor and having a ported rotary valve (controlled by the rotating casing) controlling both intake and exhaust, in accordance with an embodiment of the disclosure.

Referring to FIG. 20, an alternative engine 302 is shown. The engine 302 is different from the engine 102 in that the engine 302 includes a casing 304 having 8 sides and is a rotatable casing configured to rotate about a central axis, and a rotor 306 that includes 7 sides. Accordingly, during operation of the engine 302, both the casing 304 and the rotor 306 rotate in phase. In such a case, the rotor 306 rotates about its central axis instead of eccentric orbital rotation.

The rotary piston machine 100 having hypotrochoidal profiles are easier to seal primarily due to the lower "leaning angle" of apex seals of the sealing grid. Moreover, incorporation of the rotary valves leads to better control of the fluid exchange processes, thereby better control of intake as well as exhaust processes (for engine applications). Also, the output of the engine 102, 202, 302 is also much smoother relative to reciprocating internal combustion engines as there are three (3) power impulses for a single 5:6 combination per output shaft rotation, and four (4) power impulses for a single 7:8 combination per output shaft rotation.

Further, in some embodiments, while the engine 102 having the hypotrochoidal profiles is shown and contemplated, it may be appreciated that the rotary valve systems may be applied to rotary piston machines including an epitrochoid profile, any other suitable trochoidal, cycloidal or other profiles.

Figure 11:
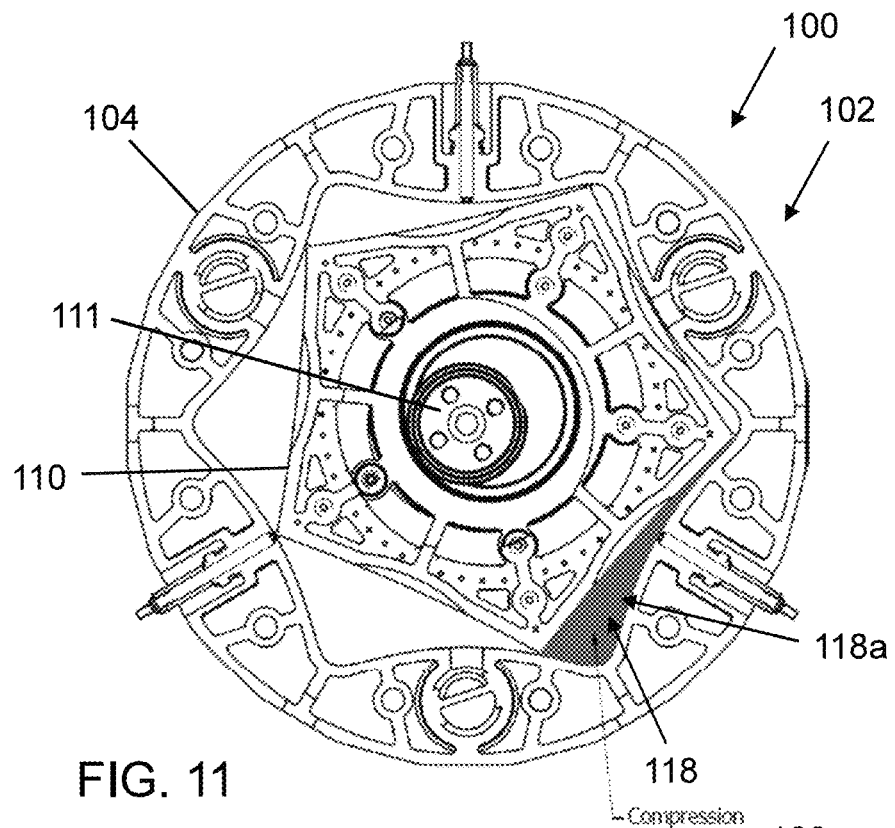
Figure 21:
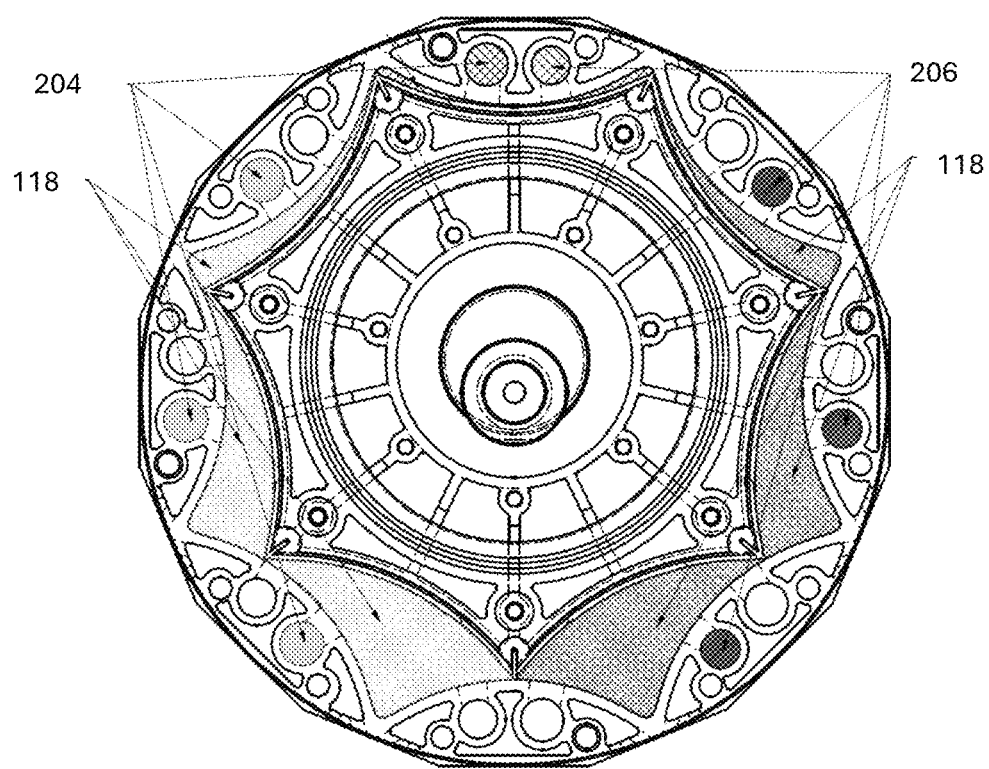
FIG. 21 illustrates a compressor, in accordance with an embodiment of the disclosure.

Referring to FIG. 21, a compressor/pump is shown. The casing having the rotary valves arranged adjacent to each other. The rotary valves may include an inlet/intake/input rotary valve 204 for the supply of low pressure fluid during inlet/intake/input cycle on one side and an outlet/exhaust/output rotary valve 206 for releasing high pressure fluid during compression cycle. The inlet/intake/input rotary valve 204 opens during inlet/intake/input cycle and the adjacent outlet/exhaust/output rotary valve 206 stays closed. Fluid flows inside the chamber due to the increase in volume of the chamber 118a. The inlet/intake/input stroke ends as the chamber 118a reaches the volume corresponding to maximum swept volume (as shown in FIG. 9). Upon further rotation of the shaft 111 and hence the orbiting of the rotor assembly 110 on the shaft 111 eccentrically while rotating in the counter direction, the volume of the chamber 118a starts decreasing initiating a compression stroke, inside the chamber 118a. As the rotor assembly 110 rotates, the volume inside the chamber 118a reaches its minimum value (as shown in FIG. 11), indicating completion of a compression stroke. The compressed fluid is delivered via the outlet/exhaust/output rotary valve 206. The functioning is in a two-cycle process of inlet/intake/input and outlet/exhaust/output across adjacent sides of the hypotrochoidal profile. The number of cycles is the number of sides (n) of the hypotrochoidal profile in the casing divided by two (2). Thus, the rotary piston machine may function as a positive displacement pump or a compressor on being powered by the output shaft.

Figure 22:
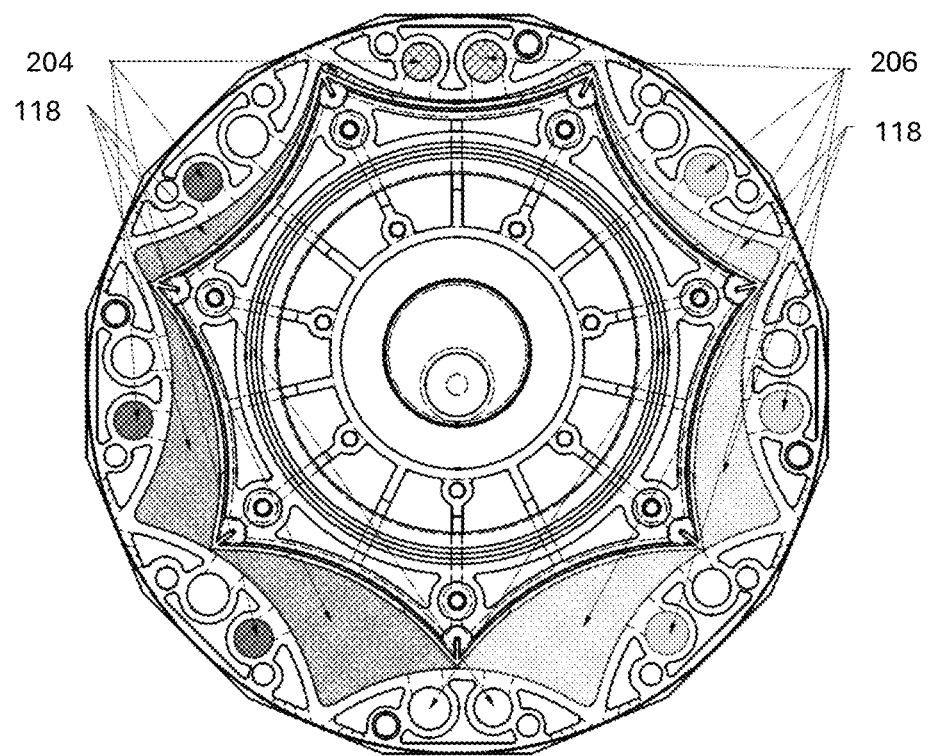
FIG. 22 illustrates an expander, in accordance with an embodiment of the disclosure.

Referring to FIG. 22, an expander/motor is shown. The expander/motor is essentially the compressor/pump (as shown in FIG. 21) functioning in an inverse or reverse function powering the output shaft, includes a casing having the rotary valves arranged adjacent to each other. The rotary valves include an inlet/intake/input rotary valve 204 for supplying pressurized fluid during inlet/intake/input cycle and an outlet/exhaust/output rotary valve 206 for releasing depleted fluid during outlet/exhaust/output cycle. The intake rotary valve 204 opens during inlet/intake/input cycle to receive a pressurized fluid while the adjacent exhaust rotary valve 206 stays closed. The fluid acts on the rotary assembly to move it to maximum volume and then is removed through outlet/exhaust/output. Thus, the rotary piston machine may function as a motor or an expander powering the output shaft.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed:

1. A rotary piston machine, comprising:
a casing with a hypotrochoidal profile;
a rotor assembly including a profile conforming to the hypotrochoidal profile of the casing;
wherein the rotor assembly has apices which conform to the hypotrochoidal profile of the casing, the apices having a leaning angle in a range of ±45 degrees;
wherein a relative motion of the casing and the rotor assembly creates variable volumes; and
wherein a plurality of rotary valves on the hypotrochoidal profile of the casing, opening and closing a plurality of associated ports into the variable volume at predetermined intervals allows the rotary piston machine to function as a compressor, an expander, an internal combustion engine or a positive displacement pump or fluid driven motor.

2. The rotary piston machine of claim 1, wherein the operation is in a single rotation model, wherein the rotor assembly and the casing each have a fixed non-coincidental axis, and wherein the rotor assembly and the casing rotate synchronously in the same direction at fixed ratios on their fixed non-coincidental apices.

3. The rotary piston machine of claim 1, wherein the operation is in a planetary rotation model, wherein the rotor assembly is mounted on an axis that is eccentric to an axis of the casing, and the rotor assembly orbits about the axis of the casing axis while rotating on its axis counter to shaft rotation in phase with the casing.

4. The rotary piston machine of claim 2, wherein the rotation of the rotor assembly and casing are synchronized at relative ratios by a phasing mechanism.

5. The rotary piston machine of claim 3, wherein the rotation of the rotor assembly and casing are synchronized at relative ratios by a phasing mechanism.

6. The rotary piston machine of claim 1, wherein a sealing grid includes side seals, apex seals, and corner seal elements that bridge the apex and side seals; wherein the sealing grid allows for a three-dimensional continuous seal path between the rotor assembly and the casing; and wherein the sealing grid prevents leakage of fluids from the working chambers.

7. The rotary piston machine of claim 3, wherein the planetary rotation model casing incorporates the plural rotary valves configured to determine the function of the rotary piston machine; wherein the plural rotary valves are driven by a synchronous mechanism.

8. The rotary piston machine of claim 1, wherein the machine is configured as the internal combustion engine, wherein the hypotrochoidal profile has an even number of sides (n), an outer surface of the rotor assembly has an odd number of sides (n−1) that is one less than sides of the casing, and wherein the apices of the outer surface of the rotor assembly conform to the hypotrochoidal profile in operation.

9. The rotary piston machine of claim 3, wherein the casing comprises one or more rotary valves arranged on alternate sides of the even-sided hypotrochoidal profile; and wherein the alternate sides of the even-sided hypotrochoidal profile, which do not have rotary valves, have means for combustion that operates as the internal combustion engine.

10. The rotary piston machine of claim 3, wherein the casing comprises one or more rotary valves arranged on alternate sides of the even sided hypotrochoidal profile; and wherein the alternate sides of the even-sided hypotrochoidal profile, which do not have rotary valves, have means of combustion for operating as the internal combustion engine.

11. The rotary piston machine of claim 3, wherein the casing comprises rotary valves adjacent each other per side of the hypotrochoidal profile; wherein the rotary valves are exclusive for fluid inlet/intake/input via the inlet/intake/input rotary valve, and for fluid outlet/exhaust/output via the outlet/exhaust/output rotary valve.

* * * * *